(12) United States Patent
Abensour et al.

(10) Patent No.: US 6,343,319 B1
(45) Date of Patent: Jan. 29, 2002

(54) METHOD AND SYSTEM FOR CURRICULUM DELIVERY

(76) Inventors: Daniel Abensour, 6285 NW. 120th Dr., Coral Springs, FL (US) 33076; Antonio Ruiz, 111 Roosevelt Dr., Poughquag, NY (US) 12570

(*) Notice: Subject to any disclaimer, the term of this patent is extended or adjusted under 35 U.S.C. 154(b) by 0 days.

(21) Appl. No.: 09/478,695
(22) Filed: Jan. 6, 2000

Related U.S. Application Data

(60) Provisional application No. 60/127,933, filed on Apr. 6, 1999.

(51) Int. Cl.[7] .............................................. G06F 15/16
(52) U.S. Cl. ....................... 709/219; 709/229; 434/322; 434/323; 434/335; 434/336; 434/350; 348/12
(58) Field of Search ................................ 709/219, 229; 434/350, 322, 323, 335, 336; 348/12

(56) References Cited

U.S. PATENT DOCUMENTS

| | | | |
|---|---|---|---|
| 4,793,813 A | * 12/1988 | Bitzer et al. | 434/335 |
| 5,261,823 A | * 11/1993 | Kurokawa | 434/323 |
| 5,310,349 A | * 5/1994 | Daniels et al. | 434/350 |
| 5,318,450 A | * 6/1994 | Carver | 434/336 |
| 5,458,494 A | * 10/1995 | Krohn et al. | 434/336 |
| 5,537,141 A | * 7/1996 | Harper et al. | 348/12 |
| 5,727,950 A | * 3/1998 | Cook et al. | 434/350 |
| 6,024,577 A | * 2/2000 | Wadahama et al. | 434/322 |
| 6,170,014 B1 | * 1/2001 | Darago et al. | 709/229 |

* cited by examiner

*Primary Examiner*—Ayaz Sheikh
*Assistant Examiner*—Frantz B. Jean
(74) *Attorney, Agent, or Firm*—Frank L. Kubler

(57) ABSTRACT

A computerized curriculum capture, organization and delivery system and method are provided, includes a data gathering mechanism for defining and downloading a quantity of data from a data source; a data retaining mechanism in communication with the data gathering mechanism for storing the quantity of data; a data organizing mechanism in communication with the data retaining mechanism for organizing the quantity of data into a cohesive and interactive lesson; a server in communication with the data retaining mechanism; a data delivery mechanism in communication with the server; and a user receiver with an input mechanism in communication with the server for operation by an end user; so that the data gathering mechanism defines and downloads a quantity of data from the data source pertaining to a selected curriculum topic, whereupon the data organizing mechanism partitions the data into curriculum units and arranges and interlinks the curriculum units into a lesson web having an interactive format; the server delivers the quantity of data to the data delivery mechanism and the data delivery mechanism delivers the quantity of data to the receiver in interactively accessible segments, and the data delivery mechanism and server deliver commands input into the end user receiver input mechanism to the data storage mechanism in a continuing interactive pattern.

18 Claims, 8 Drawing Sheets

System components of the invention

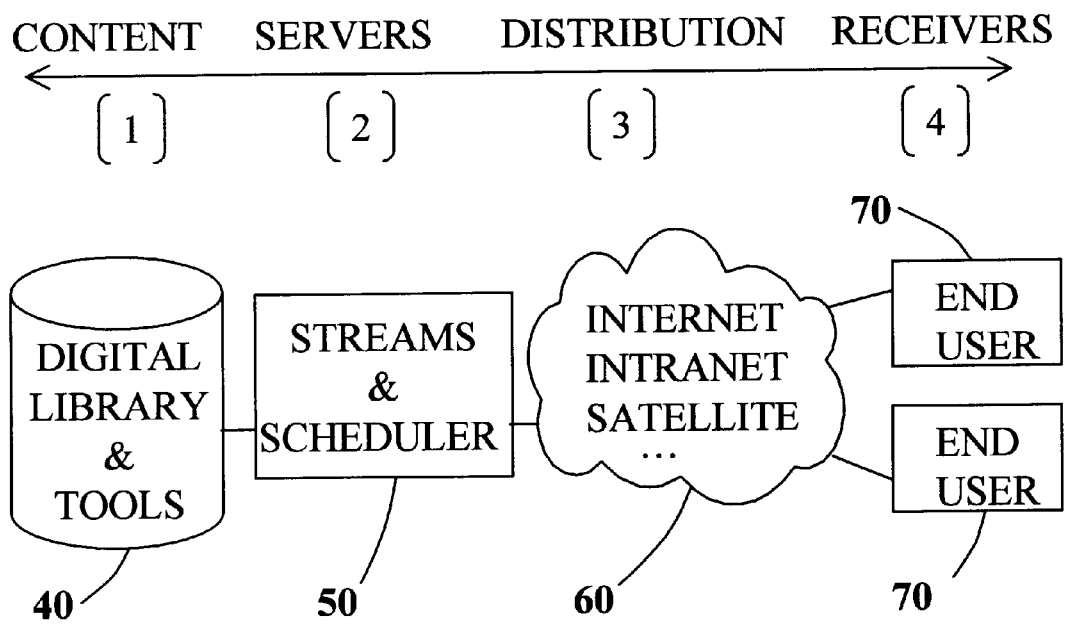
Figure 1: System components of the invention

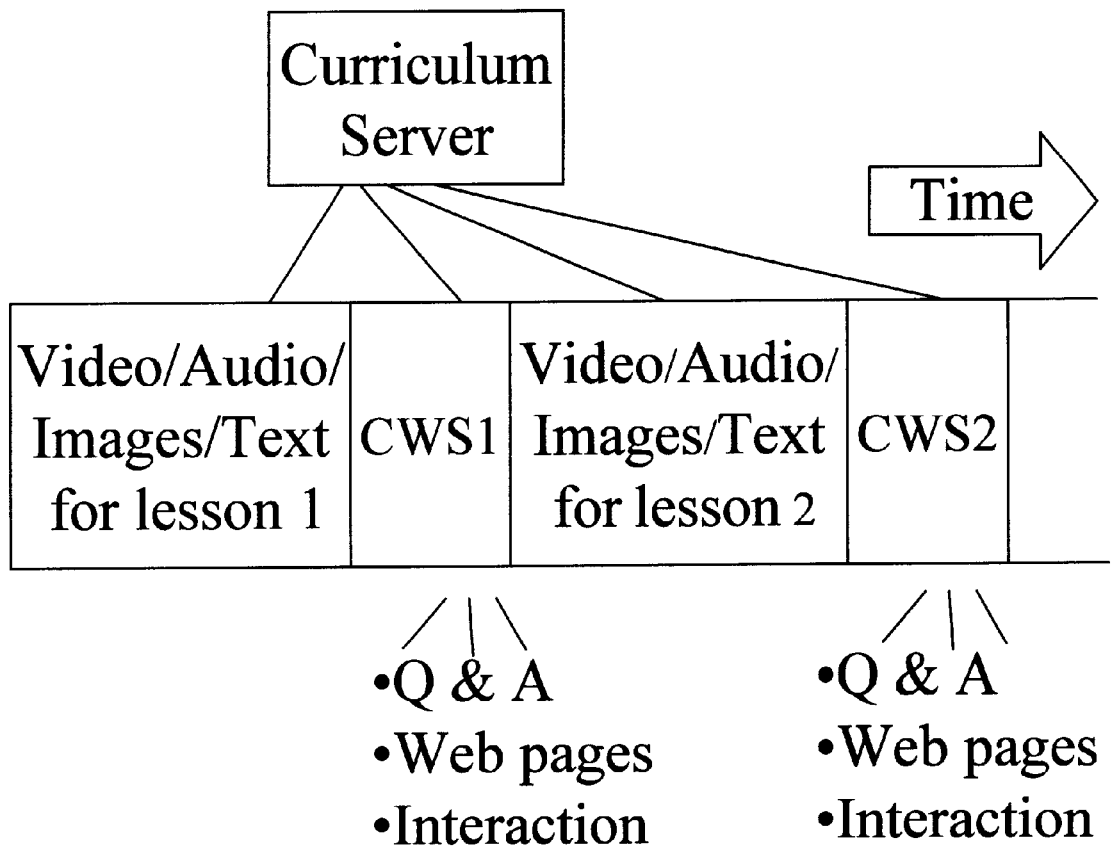
Figure 2: Digitized video lesson format

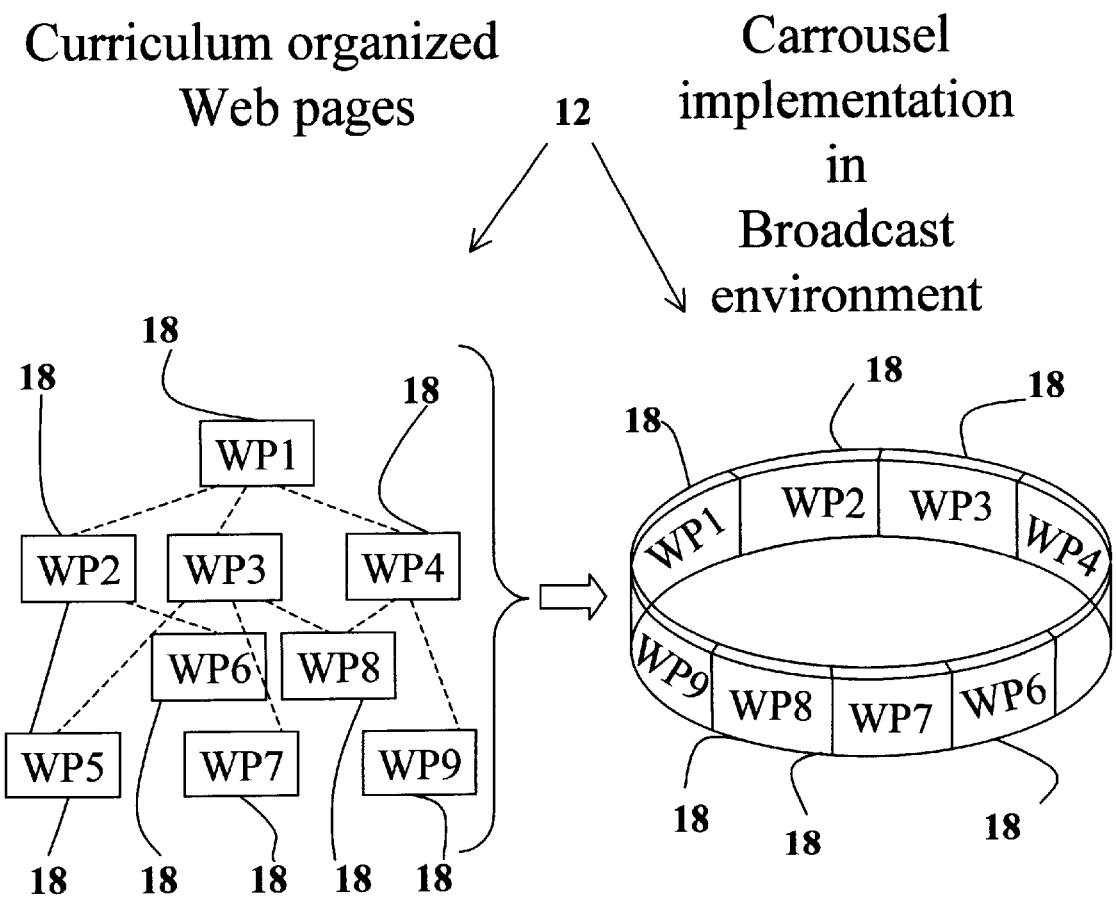
Figure 3: Digital Carrousel and pages organization

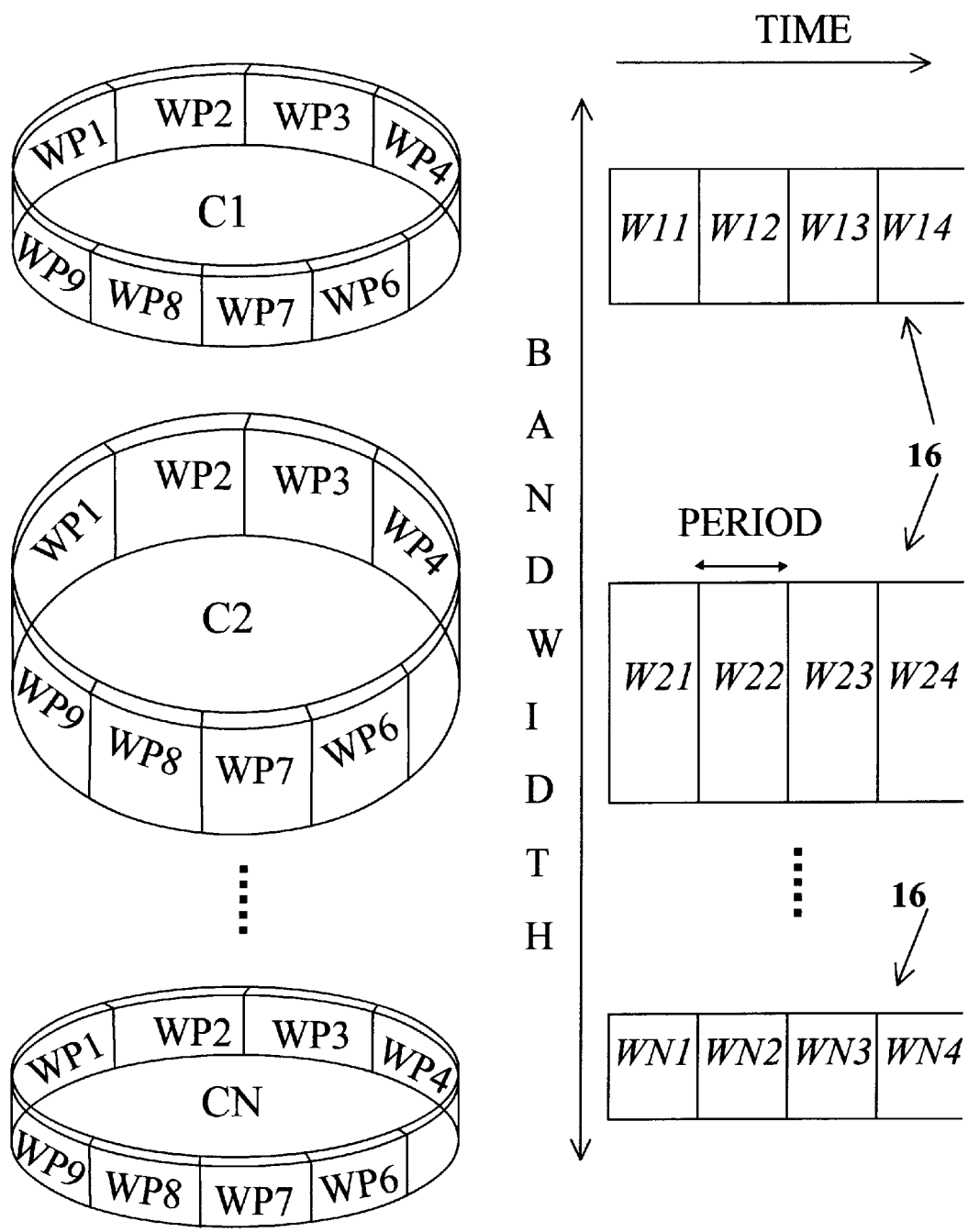
Figure 4: Multidimensional Carrousel

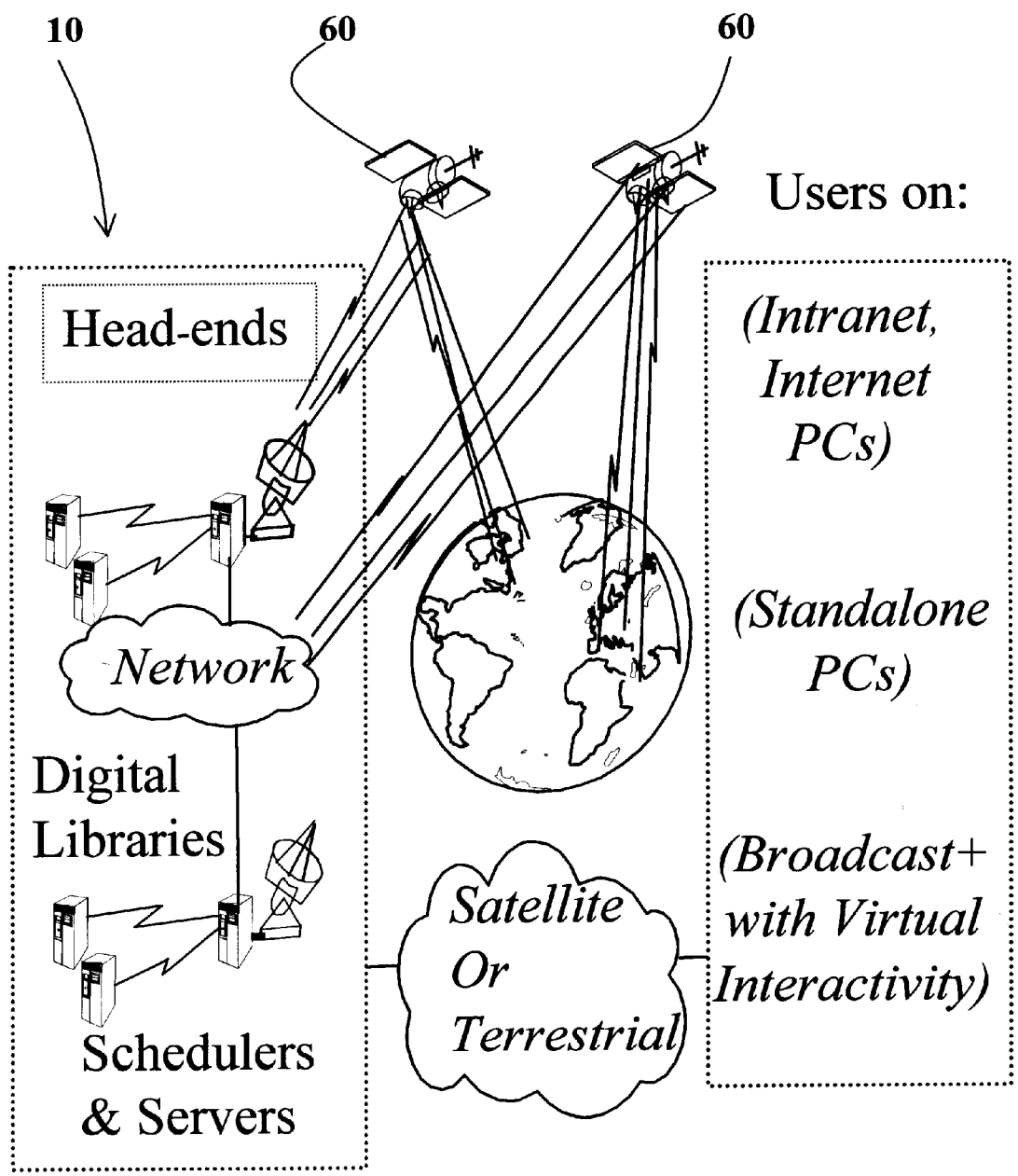
Figure 5: System configuration and utilization

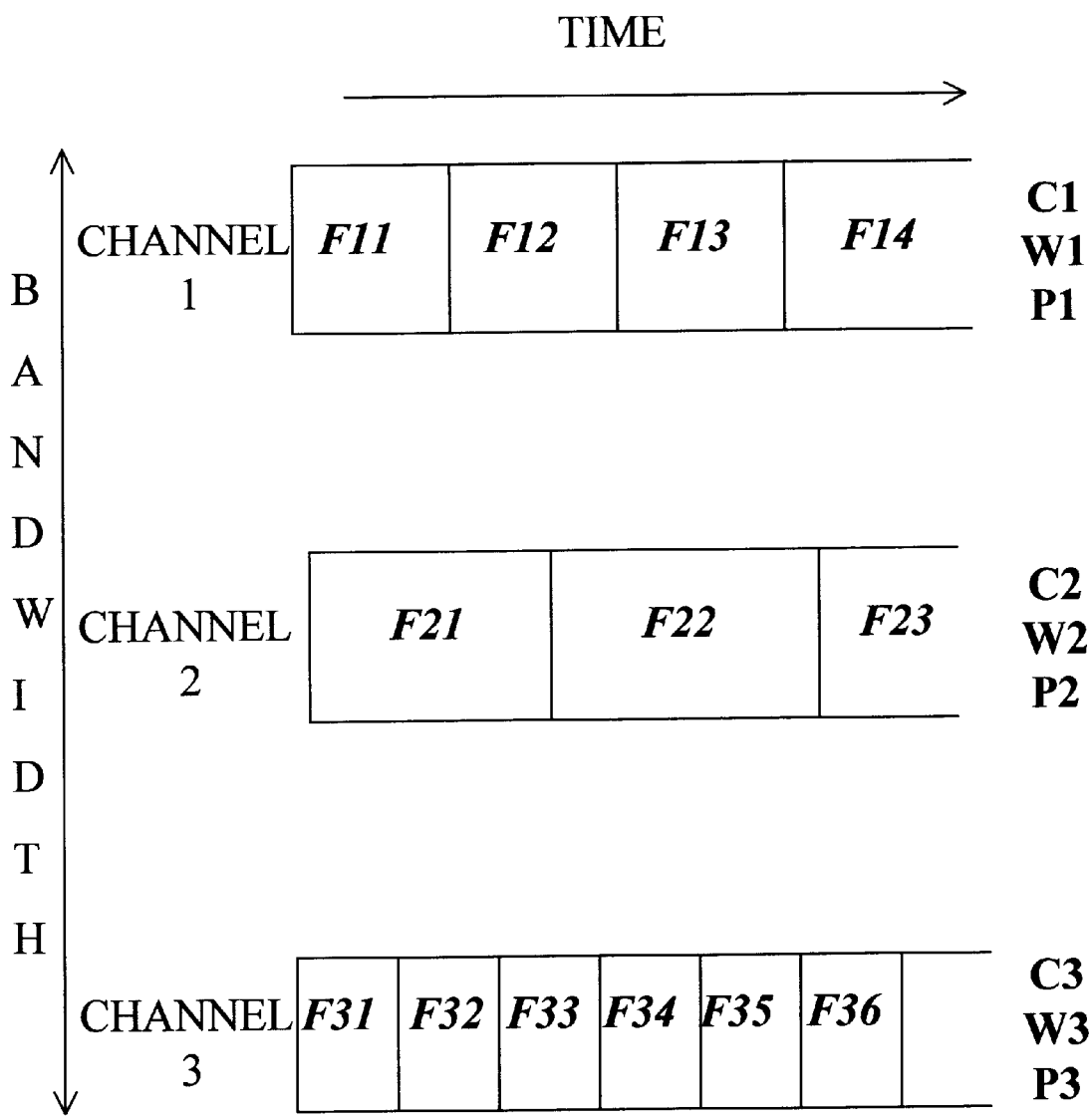
Channel bandwidth: W1 = W2 = W3
Frame period per channel: P1 ≠ P2 ≠ P3
Figure 6: Option 1. Same bandwidth for each channel

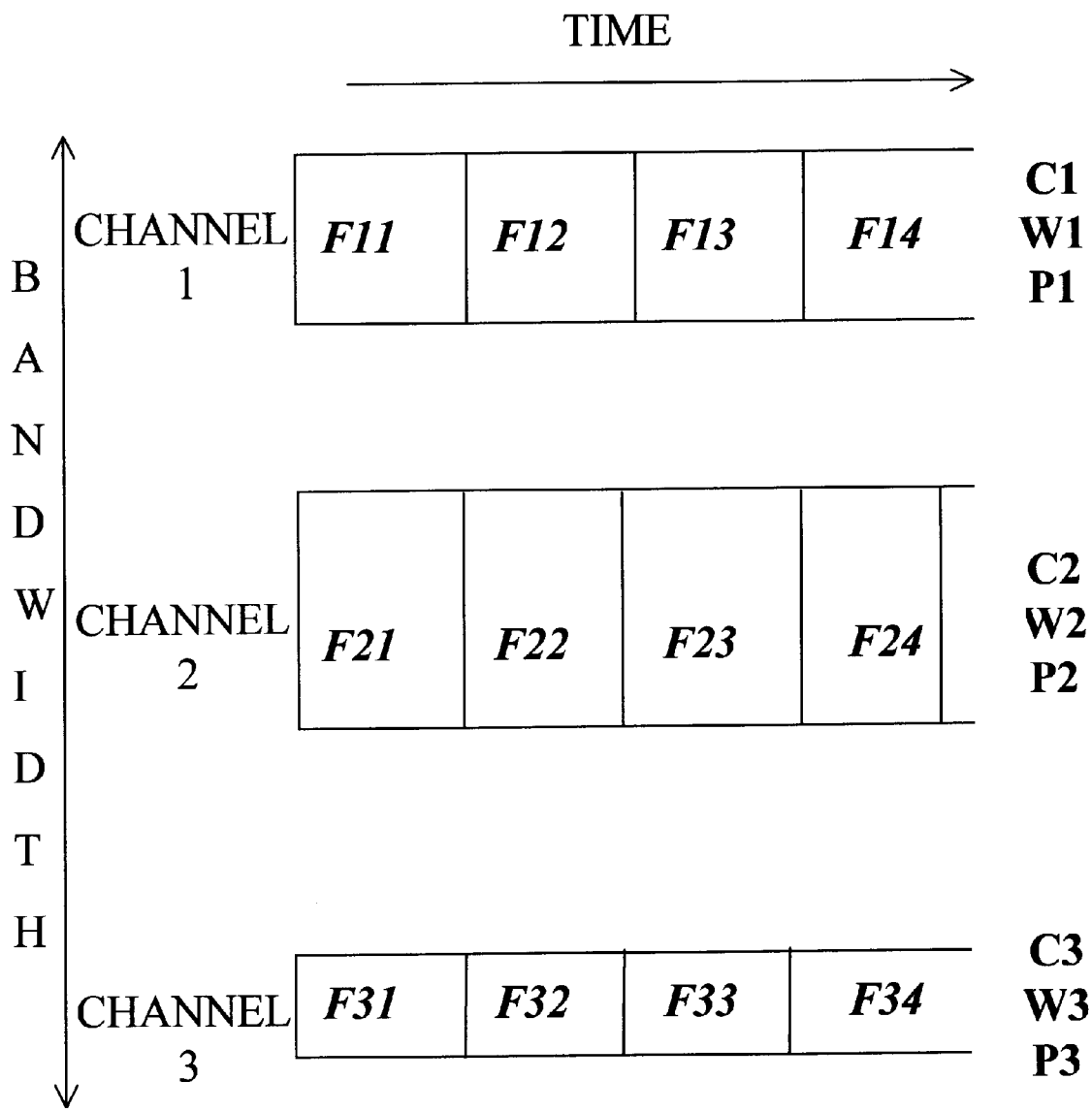
Figure 7: Option 2. Different bandwidth, same period

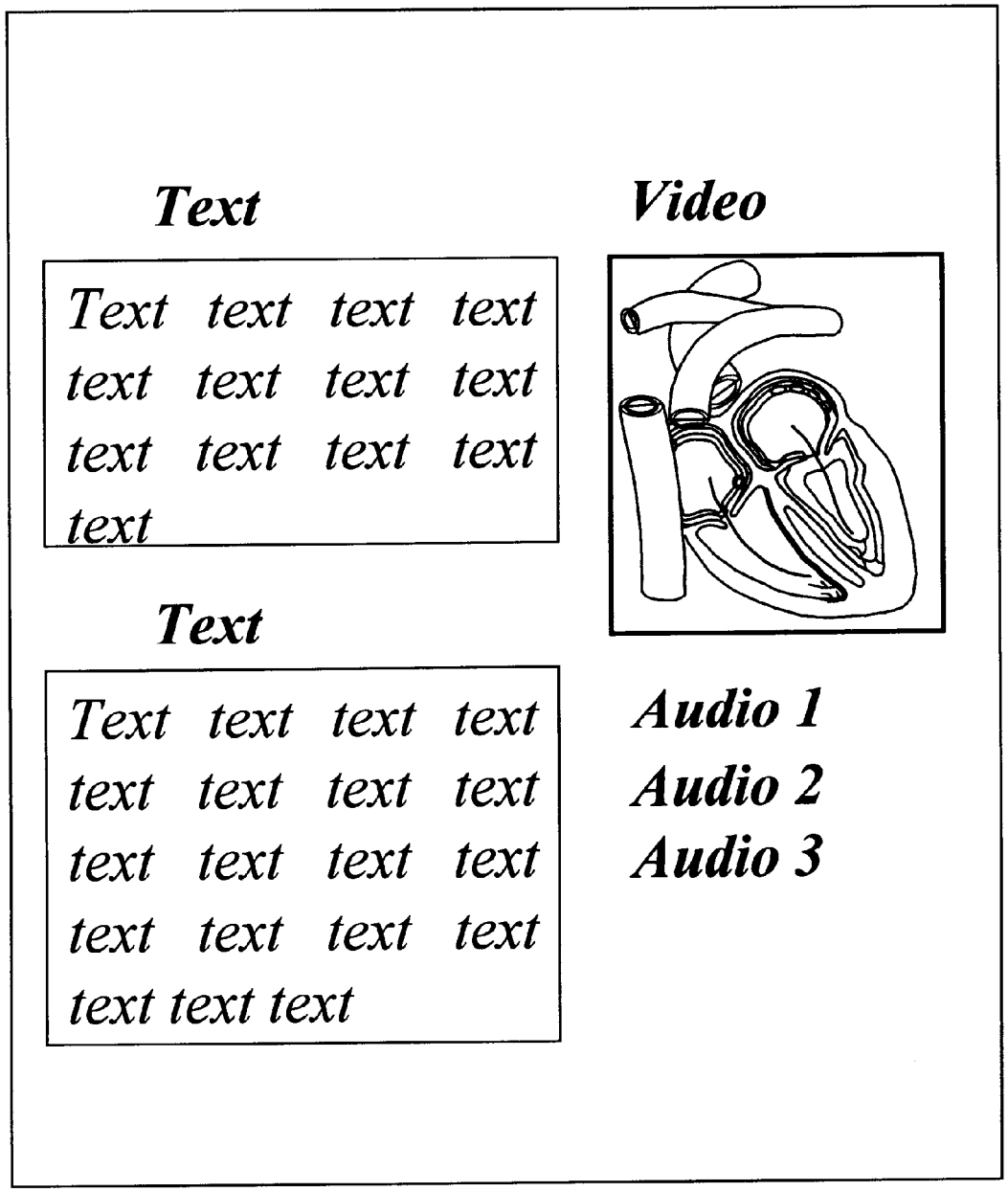
Figure 8: PIP – Picture in Picture with video, text and audio

METHOD AND SYSTEM FOR CURRICULUM DELIVERY

FILING HISTORY

This application continues from provisional application serial No. 60/127,933 filed on Apr. 6, 1999.

BACKGROUND OF THE INVENTION

1. Field of the Invention

The present invention relates generally to the field of information delivery devices and instruction techniques for education in remote and underserved areas such as many third world countries. More specifically the present invention relates to a computerized curriculum capture, organization and delivery system for defined and limited quantities of data which are drawn from a database source such as the Internet and which pertain to selected curriculum topics. This quantity of data is partitioned into units in the form of curriculum web sites, is organized and linked to form a lesson network and stored within a digital library, and is delivered through servers and a distribution network to end user receivers in an interactive format. This system resembles existing Internet and intranet access in that organized information is delivered to a computer monitor and the end user responds with commands to progress through a desired information receipt path, and differs in that an on-line connection is not necessary for interactive delivery of the information. The elimination of an on-line connection requirement makes this system portable and suited to interactive lesson delivery for students in areas in which telephone lines for Internet access are not available. As a result, the powerful pedagogical capability of interactive computer-delivered education can reach students in the most remote and underserved communities anywhere in the world.

2. Description of the Prior Art

There have in recent years been Internet and intranet computer networks for delivering organized information to end user computer monitors, which is formatted so that the end user is able to input commands and thereby respond and otherwise interact with the network to progress through a desired information access path. Such networks often provide a wealth of information which can be organized into as invaluable teaching tools. A problem with these networks is that they are only accessible from areas served by telephone links, and this requirement excludes many areas of the third world so that students are deprived of this great pedagogical advantage.

It is thus an object of the present invention to provide a method and system for curriculum delivery for which an on-line connection is unnecessary.

It is another object of the present invention to provide such a method and system suited to interactive lesson delivery for students in areas such as many third world countries.

It is still another object of the present invention to provide such a method and system which organizes captured information into a meaningful and logical lesson structure.

It is finally an object of the present invention to provide such a method and system which is efficient to operate and cost effective.

SUMMARY OF THE INVENTION

The present invention accomplishes the above-stated objectives, as well as others, as may be determined by a fair reading and interpretation of the entire specification.

A computerized curriculum capture, organization and delivery system is provided, including a data gathering mechanism for defining and downloading a quantity of data from a data source; a data retaining mechanism in communication with the data gathering mechanism for storing the quantity of data; a data organizing mechanism in communication with the data retaining mechanism for organizing the quantity of data into a cohesive and interactive lesson; a server in communication with the data retaining mechanism; a data delivery mechanism in communication with the server; and a user receiver with an input mechanism in communication with the server for operation by an end user; so that the data gathering mechanism defines and downloads a quantity of data from the data source pertaining to a selected curriculum topic, whereupon the data organizing mechanism partitions the data into curriculum units and arranges and interlinks the curriculum units into a lesson web having an interactive format; the server delivers the quantity of data to the data delivery mechanism and the data delivery mechanism delivers the quantity of data to the receiver in interactively accessible segments, and the data delivery mechanism and server deliver commands input into the end user receiver input mechanism to the data storage mechanism in a continuing interactive pattern. The data source may be the Internet or may be a distribution network where the data delivery mechanism is the distribution network.

The data retaining means is preferably a digital library. In this instance, the curriculum units and the lesson webs preferably are stored in a form which is inclusive of at least one of: text, graphics, images, audio, video, and multimedia content. The digital library preferably additionally contains applets.

The server mechanism preferably includes a service subsystem including several digital servers for the delivery of curriculum units and lessons to the user receiver. The digital server preferably incorporates conversion tools for converting the quantity of data within the retaining means into a form suitable for delivery by the delivery mechanism. The service subsystem preferably includes a mechanism for synchronizing delivery of curriculum units and lesson webs to meet receiver requirements.

The delivery of the lesson webs preferably is synchronized according to a schedule. The delivery of the lesson webs preferably is synchronized in real-time. The service subsystem optionally includes bi-directional system, or a broadcast only system, or a system which incorporates a mixture of point to point, point to multipoint and broadcast system functions.

The user receiver preferably is a user receiver subsystem including several user receivers connected via a local network incorporating one of: a gateway server and a local server, for actual reception of curriculum streams from the subsystem, and for playback of curriculum streams to the user receivers in the local network. The curriculum units preferably are curriculum websites, and these websites preferably are configured as a web site carousel.

A method is provided of computerized curriculum capture, organization and delivery, including the steps of selectively gathering a quantity of data from a data source; storing the quantity of data within data retaining mechanism; partitioning the quantity of data into curriculum units; organizing and linking the curriculum units into a lesson web within the retaining mechanism; and delivering the quantity of data through a server and through a delivery mechanism to a user receiver in a format for interactive access.

BRIEF DESCRIPTION OF THE DRAWINGS

Various other objects, advantages, and features of the invention will become apparent to those skilled in the art from the following discussion taken in conjunction with the following drawings, in which:

FIG. 1 is a schematic representation of the inventive system and method, showing the essential elements and their inter-relation.

FIG. 2 is a representation of the digitalized video format.

FIG. 3 is a schematic representation of an example of the interlinked web pages to form a lesson web, and of the carrousel implemenatation of the interlinked web pages.

FIG. 4 is a schematic representation of a multidimensional carrousel.

FIG. 5 is a representation of the hardward forming the entire system shown.

FIG. 6 is a representation of channel bandwidths, where the bandwidths are the same for each channel.

FIG. 7 is a representation of channel bandwidths, where the bandwidths differ.

FIG. 8 is an example of PIP—Picture in Picture with video, text and audio.

DETAILED DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Referring to FIGS. 1–8, a computerized curriculum capture, organization and delivery system 10 for a specifically defined and limited quantity of data drawn from a data source 20 such as the Internet pertaining to selected curriculum topics is disclosed. This quantity of data is stored, partitioned, organized and linked into a lesson web 12 within data retaining means 40 in the form of a digital library, and is delivered through servers 50 and a delivery means 60 such as delivery subsystem or a distribution network to end user receivers 70 in an interactive format. FIG. 1 illustrates the essential elements of system 10 and their inter-relation. These essential elements are a content station 40, a number of servers 50, a delivery means 60 shown as a distribution network and user receivers 70 for end users. These system 10 elements are configured into a chain, and yet this chain does not define a simple linear flow of information. In order to make system 10 interactive to the end user, rather than a mere information retrieval mechanism, each system 10 element interacts with the immediately adjacent system 10 elements, so that data and commands flow between elements to and from other elements. Data to construct a lesson web 12 initially is drawn from a vast distribution network such as the Internet, an intranet or from a satellite. This data is drawn selectively, and confined only to that which pertains to a desired lesson topic or topics. The data is then partitioned into data groupings known as curriculum units which may include individual web pages, and then organized to an interconnective lesson web 12 between these data groupings so that access of one such data grouping interactively opens access paths to elected other access groupings. See FIG. 3. It is the selection of limited data for specific lessons from a much broader data source 20, and the organization of this limited data into an interactive lesson web 12, which eliminates the need for full network access and thus brings the curriculum into the reach of people in underserved areas.

The content station 40 element preferably is a curriculum library which takes the form of a digital library 40 in which curriculum units and lesson webs 12 are stored in a form which is inclusive of one or more of the following: text, graphics, images, audio, video, or what is known in the art as multimedia content. The digital library 40 also includes associated tools for taking raw text, graphics, images, audio and/or video content and organizing them into cohesive curriculum units which are made up of one or more lessons. The library 40 also contains, as a distributable element, computer programs commonly known in the art as applets that are associated and operated with or independently of the multimedia distributable information elements.

The server 50 element preferably is a service subsystem made up of digital servers 50 used for the delivery of curriculum units and lesson webs 12. The digital server 50 may incorporate conversion and/or adaptation tools or applications to convert the digital library 40 content into a form suitable for delivery by the delivery subsystem 60. The service subsystem also incorporates the scheduler or interactive service element that accounts for synchronizing delivery of curriculum units and lesson webs 12 according to a schedule or in real-time as needed to meet the user requirements or end-to-end application requirements by users. The deliverables of a service subsystem are those elements coming from the library subsystem after they are operated and transformed by the conversion application tools in the service subsystem.

The distribution network element is a delivery subsystem made up of a delivery network 60 which connects the service subsystem to the end user receiver 70. The delivery subsystem can be a bi-directional system, a broadcast only system, or a system that incorporates a mixture of point to point, point to multipoint (e.g. multicast), and broadcast system. Regardless of the delivery network type, interactivity is achieved in a real or virtual manner. Real interactivity is effected via a return channel. Virtual interactivity is achieved as described further below using the multidimensional carrousel 16 method or constructing and accessing of lesson webs 12 also covered here as part of this invention.

The end user receiver 70 element of the system 10 preferably takes the form of a user receiver 70 including a user device which is compatible with the delivery network 60 and permits interactive view and use of the curriculum. The user receiver 70 application requirements are met by the combination of curriculum delivery via the end-to-end system matching the access, storage, processing power, display mechanism, and interactive capabilities of the user receiver 70. The user receiver 70 also can be characterized as a user receiver subsystem including a multiplicity of user receivers 70 connected via a local network (e.g. Intranet, LAN) which may also incorporate a gateway server or local server for actual reception of curriculum streams from the network subsystem, and playback of curriculum streams to the user receivers in the local user receiver network.

Functional Description of the Key Subsystems

The digital library 40 contains information and the associated tools to process and distribute the information. The base unit is the CWS 18 (Curriculum Web Site) and one or more CWS' comprise a lesson web 12. Each CWS 18 contains multimedia objects including video, audio, images, graphics and text; and optional computer programs or applets. Each lesson web 12 starts with the broadcast of a unit inclusive of multimedia information and computer programs, and is followed by interaction with specific CWS's for the Q & As as shown in FIG. 2. The CWS 18 can have typical web-site multimedia content such as video, audio, images, graphics and text. Each lesson web 12 is organized with one or more CWS's 18. The web-sites thus developed as apart of a digital library 40 are then converted and adapted for delivery over the satellite medium or Internet as a server stream of digital content that is to be decoded by the receivers 70. The server 50 schedules both digital video and CWS 18 streams for delivery. In the case of a television screen functioning as the display tool, the most common delivery adapts all CWS's 18 to the MPEG video frame and MPEG transport.

The delivery network 60 can be bi-directional or uni-directional. If it is uni-directional the end-to-end system 10 relies on the multidimensional carrousel method described in the paragraphs which follow. A distribution network 60 can be implemented in a fully interactive manner (Internet/Intranet), partially interactive (mixed Internet/Intranet and broadcast) and virtually interactive (multidimensional carrousel).

The digital carrousel lesson web 12 is represented below. At the heart of the delivery, the curriculum web-site (CWS) 18 consists of the following: web pages (Wpi, where I is the web page number), hyperlinks that relate each web page to other web pages, and hot buttons that represent the hyperlinks to the user selections.

The carrousel represents the curriculum web-site lesson 12 for any given class. In a broadcast environment where there is no required return channel, interactivity is achieved by repeating the delivery of the carrousel web-site stream with a cycle time "Tc". All the set top boxes within the satellite coverage area receive the stream. CWS pages 18 get selected with complete interactivity and full selection with an average access time "Ta" which is smaller than cycle time (i.e. Ta Tc). See FIG. 3.

Multidimensional carrousels 16 are constructed from a multiplicity of single carrousels. FIG. 4 below represents a multidimensional carrousel 16 containing multiple single carrousels of different bandwidth, cycle time, and delivery duration synchronized according to control information carried with the carrousel and incorporating computer programs or applets that concurrently operate on the multimedia carrousel 16 information or on other information in the user receivers 70.

User receivers 70 (e.g. set top boxes, network PCs, PCs, WebTVs) with enough memory and processing power that can receive digital streams with control protocols (e.g. MPEG video streams and transport, HTML, webpages and TCP/IP) are used to process the CWS pages 18 and hyperlink information. Such user receivers 70 can be used for decoding of interactive CWS pages 18 from the streams received from the satellite.

The end-user receiver mechanism 70 can be a PC, a TV monitor and customized set top box with its remote control. This mechanism 70 permits the end user to receive the curriculum and during the Q & As session, he or she is able to use interactivity of the system at different levels depending mainly on the delivery network characteristics. The diagram of FIG. 5 shows a possible system 10 implementation and utilization of the invention.

Carrousel Embodiments Generally

The multidimensional carrousel 16 can be implemented in several ways, as set forth in the paragraphs which follow.

Option 1: Multiple Channels of Equal Bandwidth but Different Periods. A single carrousel or lesson web 12, characterized by the bandwidth, a period and a duration, is expanded into a multidimensional carrousel 16 with multiple channels of equal bandwidth. Since multiple channels of equal bandwidth are required, then the information capacity is variable by permitting the use of different periods. The combination of bandwidth and period allows for multiple capacity channels in the multidimensional carrousel 16. Synchronization of the multidimensional carrousel 16 is achieved by basing the multidimensional carrousel 16 basic period on a single "root" carrousel, and deriving all other periods and their relation from that "root" period using known techniques in the art. FIG. 6 illustrates this option and shows the frame succession in each channel. Fij represents the "j"th frame of the "i"th channel. Each frame is a subset of a CWS 18 defined earlier and can be a web page, a video or an audio frame, a Java applet, and so forth.

Option 2: Multiple Channels of Equal period but Different Bandwidths. This option is shown in FIG. 7 where multiple channels with the same period are combined into a multi-dimensional carrousel 16. Each channel has the same period, then the whole multidimensional carrousel 16 can be fully synchronized.

Option 3: Combination of Option 1 and Option 2.

Parameters of the Multidimensional Carrousel

The multidimensional carrousel 16 consists of the following parameters:

A multiplicity of channels Vi, and I from 1 to N
A Bandwidth allocation for each channel Wi
A Period for each channel Pi
A Duration schedule for each channel Di
A set of Hyperlinks among the elements within and across the channels Hj
A total bandwidth utilization of SUM (Wi)

Specific Carrousel Embodiments a.) Picture in Picture Video for Interactive Website Pages In a multidimensional carrousel 16 environment as described previously, system 10 incorporates in picture (PIP) video concurrently displayed with interactive website pages obtained from the multidimensional carrousel 16. The video or videos come from the multidimensional carrousel 16 and are incorporated into a PIP by the receiving units, or are pre-assembled by the server 50 and incorporated into any given carrousel or lesson web 12. The position of the PIP, the playback duration, the rules of interactivity in the presence of PIP, and the availability of video streams for PIP at any given multidimensional carrousel 16 time are design parameters constructed as part of the information launched by the service subsystem.

b. Carrousels with Multiple Audio Tracks

Multidimensional carrousel websites 18 can be constructed to take advantage of multiple audio tracks (e.g. different languages, different background music options, different interaction response sounds, etc.) by incorporating one or more carrousel channels containing the audio segments.

c. Carrousels with Multiple Text Tracks

As in "b" above, except it is with text.

d. Carrousels with Multimedia Information and Computer Programs

Multiple channels comprising a multidimensional carrousel 16 of multimedia information and computer programs that operate on current or upcoming carrousel website information. The computer programs can be downloaded in background or foreground mode based on multidimensional carrousel website transport control parameter directives. Multimedia information is then effected by the computer programs (e.g. Java applets) now running in the receiver unit.

e. Multidimensional Carrousels of Virtual Interactivity Mixed with Bi-directional Interactivity Capabilities Mixing the virtual interactivity with real bi-directional interactivity may be required in situations where information needs to be. collected on activities happening at the receiver user end. Bi-directional interactivity can be put to good use here by taking advantage of the return channel to send that information back to the service subsystem for collection and measurement. Example uses of this method include but are not limited to test score collection, proficiency measurements, order and schedule feedback.

f. Bi-directional Interactive Curriculum Delivery with Multimedia Information and Computer Program Carrousels In this case, a bi-directional communication mechanism is provided that can provide the predominant means of communication but at limited bandwidth capacity. For this purpose, the total broadcast bandwidth available in a multidimensional carrousel can be used to multicast and broadcast multimedia rich information such as video, audio, images, website pages, graphics, and computer programs. This information achieves the virtual interactivity because of the multidimensional carrousel construction described herein and permits the mixture of the best of both to achieve more compelling applications not be possible by using one medium alone.

g. Video and Audio Broadcasts Combined with Synchronized Scheduled Multidimensional Carrousel Broadcasts In contrast to "f" above, in this case a full broadcast stream of video and audio is provided that has concurrent with it a multidimensional carrousel of multimedia information and computer programs to create virtual interactive delivery of information and computer. Multimedia information is then effected by the computer programs (e.g. Java applets) now running in the receiver unit 70.

e.) Multidimensional Carrousels of Virtual Interactivity Mixed with Bi-directional Interactivity Capabilities Mixing the virtual interactivity with real bi-directional interactivity may be required in situations where information needs to be collected on activities happening at the user receiver 70 end. Bi-directional interactivity can be put to good use here by taking advantage of the return channel to send that information back to the service subsystem for collection and measurement. Example uses of this method include but are not limited to test score collection, proficiency measurements, and order and schedule feedback.

f.) Bi-directional Interactive Curriculum Delivery with Multimedia Information and Computer Program Carrousels In this case, a bi-directional communications mechanism is provided that can give the predominant means of communication but at limited bandwidth capacity. For this purpose, the total broadcast bandwidth available in a multidimensional carrousel 16 can be used to multicast and broadcast multimedia rich information such as video, audio, images, website pages, graphics, and computer programs. This information achieves virtual interactivity because of the multidimensional carrousel 16 construction described herein and permits the mixture of the best of both to achieve more compelling applications that would otherwise not be possible by using one medium alone.

g.) Video and Audio Broadcasts Combined with Synchronized Scheduled Multidimensional Carrousel Broadcasts In contrast to f.) above, in this case we have a full broadcast stream of video and audio that has concurrent with it a multidimensional carrousel 16 of multimedia information and computer programs to create virtual interactive delivery of information and computer programs associated with the video and audio broadcast being delivered at the time. Example applications and embodiments are as follows:

A video and audio broadcast with current multimedia carrousel 16 to allow the viewer or listener to engage an interactive session with the information on the multimedia carrousel 16. Such is the case when an interactive session follows a video and audio stream delivery. The virtual interactivity is used to create the interactive medium. Bi-directional interactivity can be used to collect information from the user side.

A video and audio stream that could be slowing a movie or a demonstration and concurrently or following the video and audio stream delivery, a multidimensional carrousel 16 full of multimedia information and computer programs (e.g. all of them comprising a completely interactive multimedia application such as a laboratory simulation, experiment, or video-game like delivery of an application) can be downloaded for immediate startup on the receiver device such as a smart settop box, a PC, a network computer, or equivalent intelligent user device (including a video game console).

Parameters for Receiver Units

Receiver units 70 have been characterized as consisting of simple receivers such as Settop boxes with television displays, PCs, and network PCs. Receiver units 70 also consist of servers, gateways, or cache subsystems which can in turn redistribute the multidimensional carrousel information (i.e. multimedia information and computer programs) to simple receivers in LANS, Intranets, Extranets.

The parameters to consider in implementing this invention with any receiver 70 include the following:

Processing power of the receiver. That is, the capability to process one or more carrousel channels in terms of video decoding capability, control transport decoding capacity, audio decoding capacity, text processing capacity, web information processing capacity, graphics processing capacity, image processing capacity, and computer program downloading and computer program startup capacity.

Memory capacity associated with any of the activities above.

Communication capacity to be able to receive one or more channels of carrousel information.

Processor I/O capacity to be able to download and startup programs.

Multimedia decoding and playback capacity (also covered above but explicitly mentioned here.)

Method

In practicing the invention, the following method may be used. The method includes the performance of the following operations on the curriculum: organization, presentation, partitioning, and essential message preparation. The resulting curriculum is then presented as self-contained lessons according to a lesson plan that is part of each curriculum unit. The lesson and lesson plans are encapsulated in suitable portions consistent with the service subsystem and delivery subsystem. The method also incorporates the preparation or production of curriculum as obtained from the original form and adding the desired multimedia elements required by the rest of the end-to-end system. The method also incorporates a conversion and/or adaptation tool or application in (2) to make the curriculum deliverables compatible with (3) and (4).

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A computerized curriculum capture, organization and delivery system, comprising:

data gathering means for defining and downloading a quantity of data from a data source;

data retaining means in communication with said data gathering means for storing said quantity of data;

data organizing means in communication with said data retaining means for organizing said quantity of data into a cohesive and interactive curriculum units comprised of instructional sequenced segments of curriculum material transformed into multidimensional carrousels with virtual interactivity suitable for transport over the broadcast network mode with virtual interactive access from any receiver including a direct receiver connected to a digital set top box as well as over any other network transport mode as described in the embodiments;

server means in communication with said data retaining means;

data delivery means in communication with said server means;

and a user receiver with input means in communication with said server means for operation by an end user;

such that said data gathering means defines and downloads a quantity of data from said data source pertaining to a selected curriculum topic, whereupon said data organizing means partitions said data into sequenced segments of curriculum units and arranges and interlinks said curriculum units into a lesson web that can be taken over any transport network including the broadcast mode to a direct receiver and digital set top box having an interactive format made possible by the virtual interactivity embodied in the multidimensional carrousels of this invention; said server means delivers said quantity of data to said data delivery means and said data delivery means delivers said quantity of data to said receivers in interactively accessible segments, and said data delivery means and server means deliver commands input into said end user receiver means to said data storage means in a continuing interactive pattern;

wherein the delivery of virtually interactive lessons via curriculum web sites is achieved by the multidimensional carrousels having an embodiment which is one of: picture in picture for interactive web site pages, carrousels with multiple audio tracks, carrousels with multiple text tracks, carrousels with virtual interactive time sequenced data and computer programs, multidimensional carrousels of virtual interactivity mixed with bi-directional interactivity capabilities, and bi-directional interactivity curriculum units delivery with multimedia information and computer program for digital video and audio broadcasts combined with synchronized scheduled multidimensional carrousels broadcasts.

2. The system of claim 1, wherein said data source is the Internet, wherein selected data is suitably chosen in scope, size, and complexity so that it can be transformed into the multidimensional carrousels.

3. The system of claim 1, wherein said data source is a distribution network and wherein said data delivery means is said distribution network, wherein all delivery networks, including the broadcast mode become suitable for carrying and delivering the multidimensional carrousels as ultimately received by the end-user receiver including a direct receiver and a digital set top box.

4. The system of claim 1, wherein said retaining means is a digital curriculum library, wherein the digital curriculum library is suitable for storage and retrieval of all the primitive data elements such as text, graphics, images, audio, video and executable program modules comprising the curriculum material and other elements required in the data and or executable programs that are transformed into the multidimensional carrousels.

5. The system of claim 1, wherein said retaining means is a digital curriculum library in which said curriculum units and said lesson webs are stored in a form which is inclusive of at least one of: text, graphics, images, audio, video and executable program modules as content; and wherein the digital curriculum library is suitable for storage and retrieval of at least one of: text, graphics, images, audio, video, and executable program modules as content comprising curriculum and data and programs that are transformed into the multidimensional carrousels.

6. The system of claim 5, wherein said curriculum units are curriculum websites, wherein the digital curriculum libraries are transformed into the multidimensional carrousels.

7. The system of claim 6, wherein said digital curriculum libraries are configured as a multidimensional carrousel in any of the forms of the multidimensional carrousels.

8. The system of claim 4, wherein said digital curriculum library additionally contains applets for being transported as part of the multidimensional carrousels.

9. The system of claim 1, wherein said server means comprises a service subsystem comprising a plurality of digital servers for the delivery of curriculum units to said receiver, wherein the curriculum units delivered to said receiver are transformed into the multidimensional carrousels.

10. The system of claim 9, wherein said service subsystem comprises means for synchronizing delivery of curriculum units multidimensional carrousels with virtual interactivity suitable for transport over other network transport modes for virtual interactive access from a receiver connected to a digital set top box to meet receiver requirements, according to the synchronization required in any of the implementations of the multidimensional carrousels.

11. The system of claim 10, wherein delivery of said lesson webs is synchronized according to a schedule, wherein the schedule mechanism is for the start times and duration times over which the various embodiments of the multidimensional carrousels are required to become available and presented to any of the end user receivers.

12. The system of claim 10, wherein delivery of said curriculum units is synchronized in real-time for making available the various data and program elements of the multidimensional carrousels as required by the curriculum units that need to be presented to the end user receivers.

13. The system of claim 10, wherein said receiver is a direct television receiver.

14. The system of claim 9, wherein said service subsystem comprises a bi-directional system, wherein the end user receiver has means for providing responses to the information presented by the multidimensional carrousels.

15. The system of claim 9, wherein said service subsystem comprises a broadcast only system for delivering the multidimensional carrousels and the virtual interactivity is achieved by the embodiment of those multidimensional carrousels as described in the body of the patent.

16. The system of claim 9, wherein said service subsystem comprises a system which incorporates a mixture of point to point, point to multipoint and broadcast system functions, wherein the point to point, the point to multipoint, and the broadcast system functions could be used for further redistribution of the multidimensional carrousels.

17. The system of claim 1, wherein said digital servers incorporates conversion tools for converting the quantity of data within said retaining means into a form suitable for delivery by said multidimensional carrousels.

18. The system of claim 1, wherein said user receiver is a user receiver subsystem comprising a multiplicity of user receivers connected via a local network incorporating one of: a gateway server and a local server, for actual reception of curriculum streams from said subsystem, and for playback of curriculum streams to said user receivers in said local network with the purpose of re-transmitting in real-time or any other time the multidimensional carrousels.

* * * * *